(No Model.) 10 Sheets—Sheet 1.

W. H. MORGAN.
INGOT CHARGING CRANE.

No. 551,830. Patented Dec. 24, 1895.

Witnesses
E. J. Nottingham
G. F. Downing

Inventor
W. H. Morgan
By H. A. Seymour
Attorney (No Model.) 10 Sheets—Sheet 2.
W. H. MORGAN.
INGOT CHARGING CRANE.

No. 551,830. Patented Dec. 24, 1895.

Witnesses
O. D. Nottingham
G. F. Downing

Inventor
W. H. Morgan
By H. A. Seymour
Attorney (No Model.) 10 Sheets—Sheet 5.

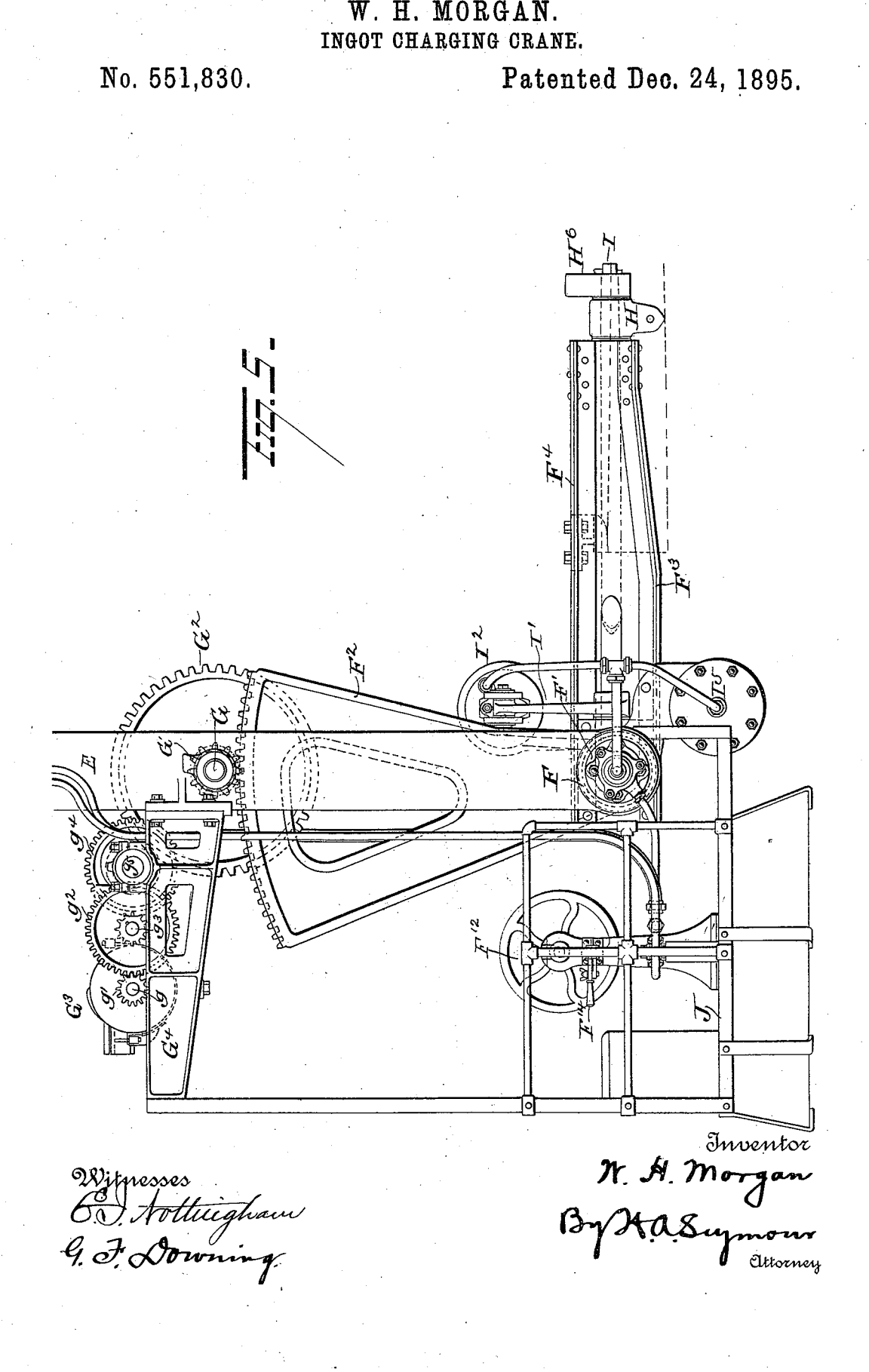

W. H. MORGAN.
INGOT CHARGING CRANE.

No. 551,830. Patented Dec. 24, 1895.

Witnesses
C. J. Nottingham
G. F. Downing

Inventor
W. H. Morgan
By H. A. Seymour
Attorney (No Model.) 10 Sheets—Sheet 8.

W. H. MORGAN.
INGOT CHARGING CRANE.

No. 551,830. Patented Dec. 24, 1895.

Witnesses
E. J. Nottingham
G. F. Downing

Inventor
W. H. Morgan
By H. A. Seymour
Attorney (No Model.) 10 Sheets—Sheet 9.
W. H. MORGAN.
INGOT CHARGING CRANE.
No. 551,830. Patented Dec. 24, 1895.
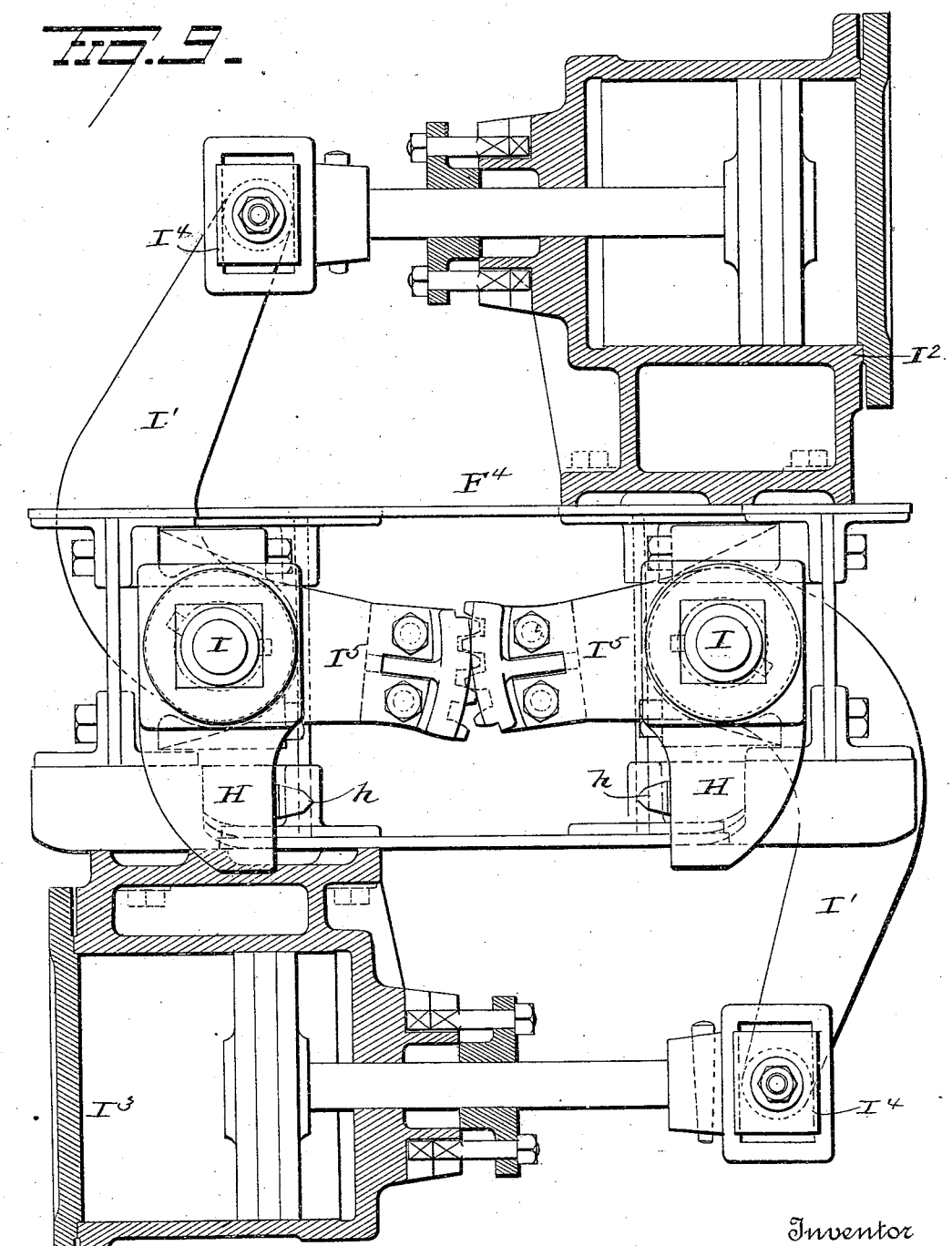
Witnesses
E. J. Nottingham
G. F. Downing
Inventor
W. H. Morgan
By K. A. Seymour
Attorney

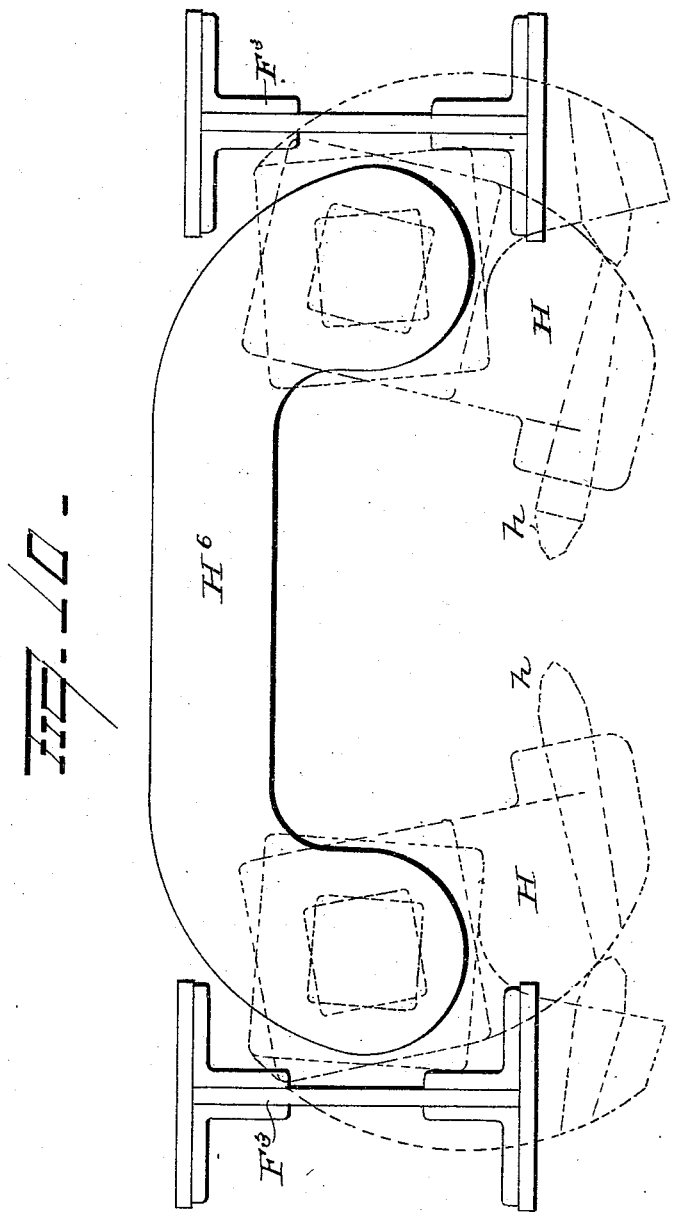

UNITED STATES PATENT OFFICE.

WILLIAM HENRY MORGAN, OF ALLIANCE, OHIO.

INGOT-CHARGING CRANE.

SPECIFICATION forming part of Letters Patent No. 551,830, dated December 24, 1895.

Application filed January 11, 1895. Serial No. 534,562. (No model.)

*To all whom it may concern:*

Be it known that I, WILLIAM HENRY MORGAN, of Alliance, in the county of Stark and State of Ohio, have invented certain new and useful Improvements in Ingot - Charging Cranes; and I do hereby declare the following to be a full, clear, and exact description of the invention, such as will enable others skilled in the art to which it appertains to make and use the same.

My invention relates to an improvement in overhead cranes, and more particularly to ingot-charging cranes, the object of the invention being to provide mechanism capable of grasping an ingot, conveying same to any one of a series of furnaces, and depositing same in the furnace, and also for removing the ingot from the furnace and depositing same on a car or other vehicle or on the feed rolls or carriage leading to a train of rolls.

My invention consists in the parts and combinations of parts, as will be more fully described, and pointed out in the claims.

Figure 1:
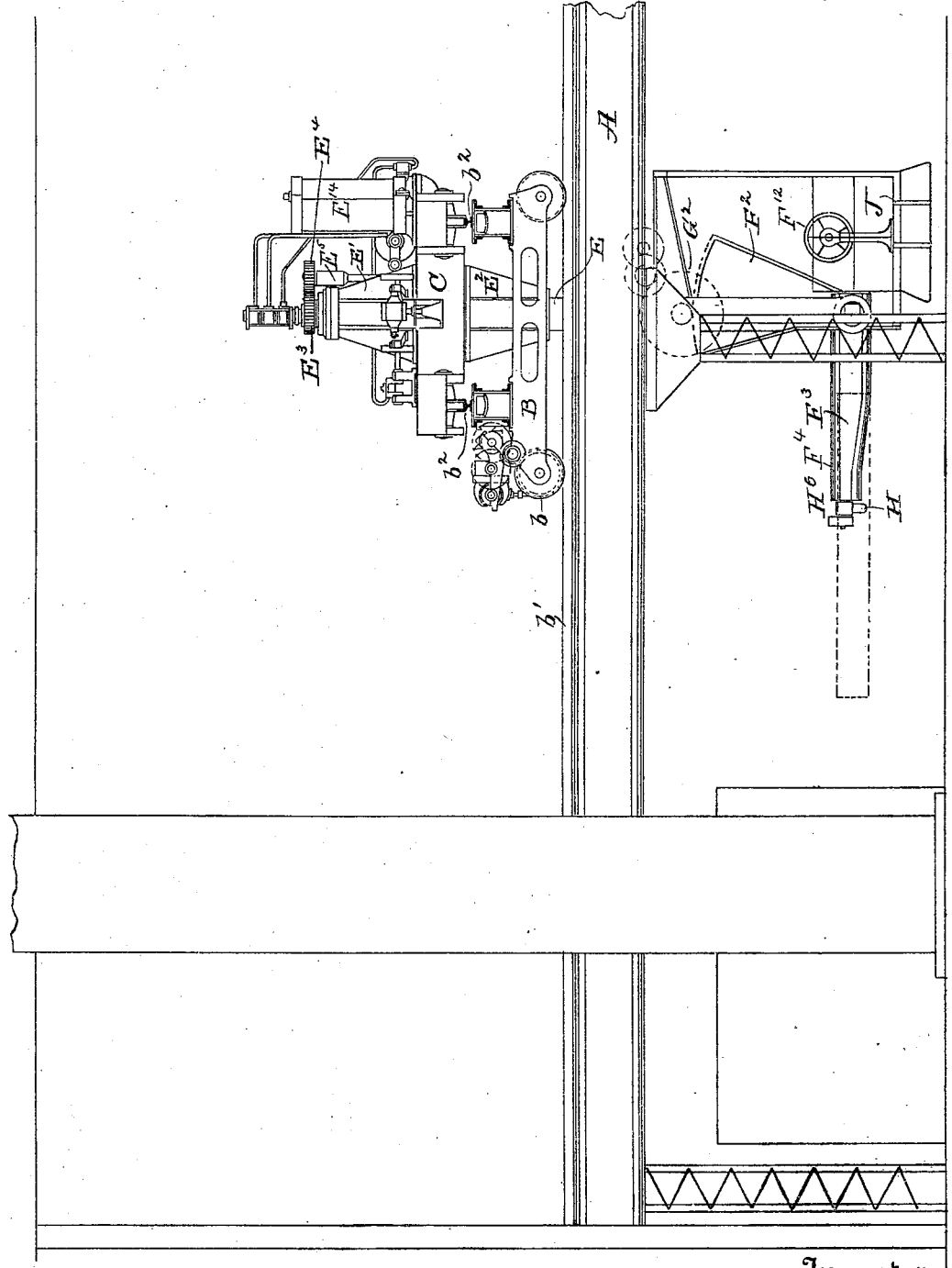
Figure 2:
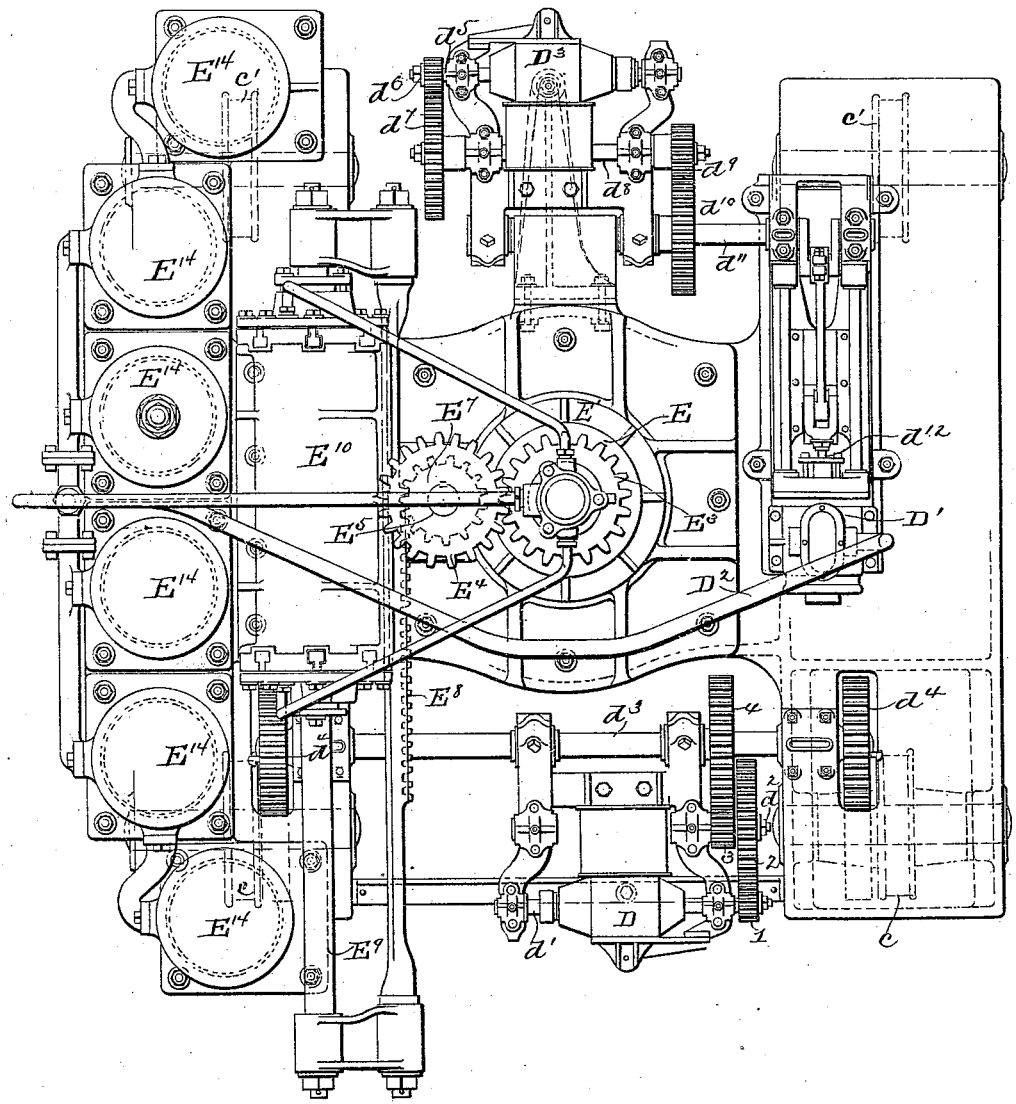
Figure 3:
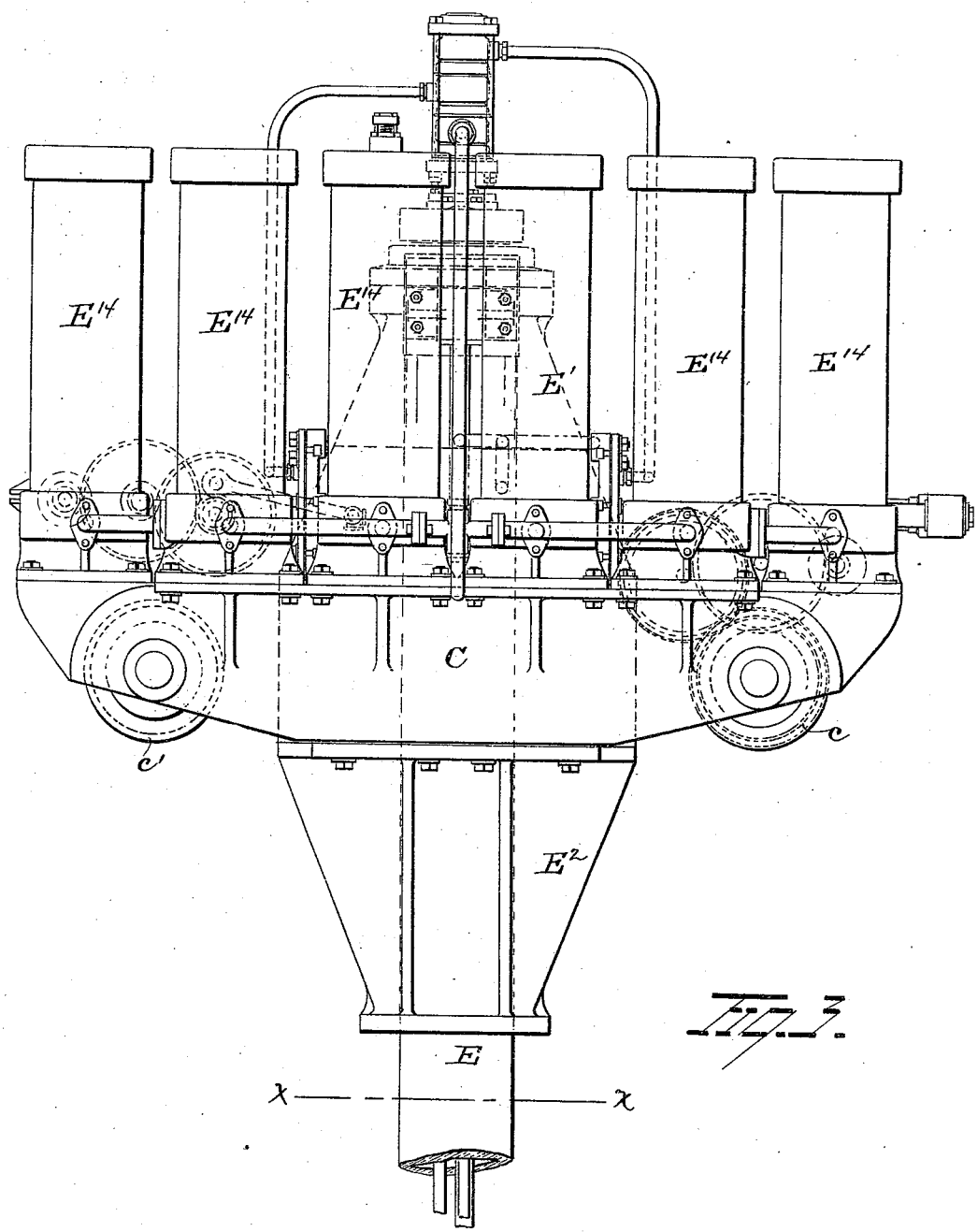
Figure 4:
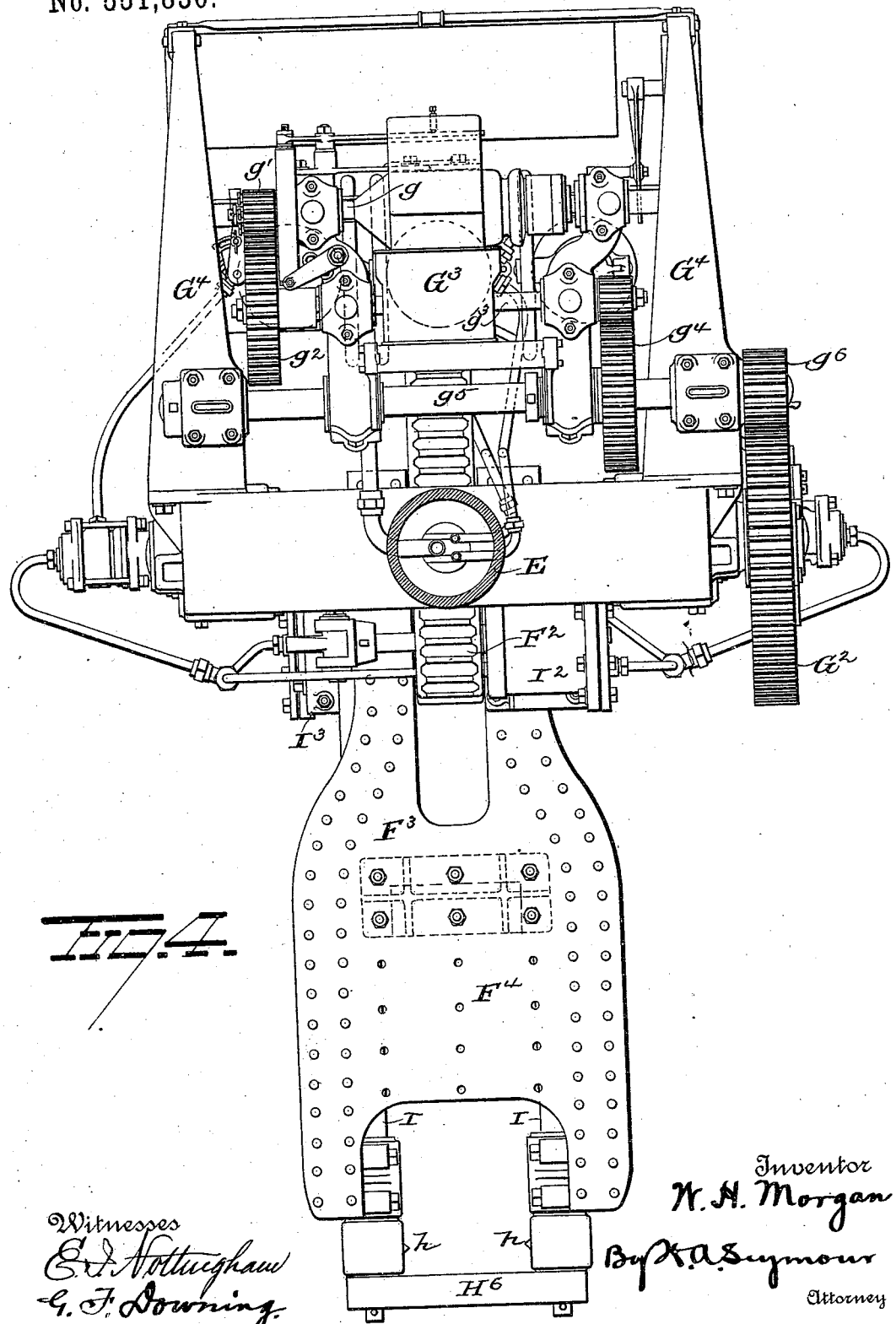
Figure 5:
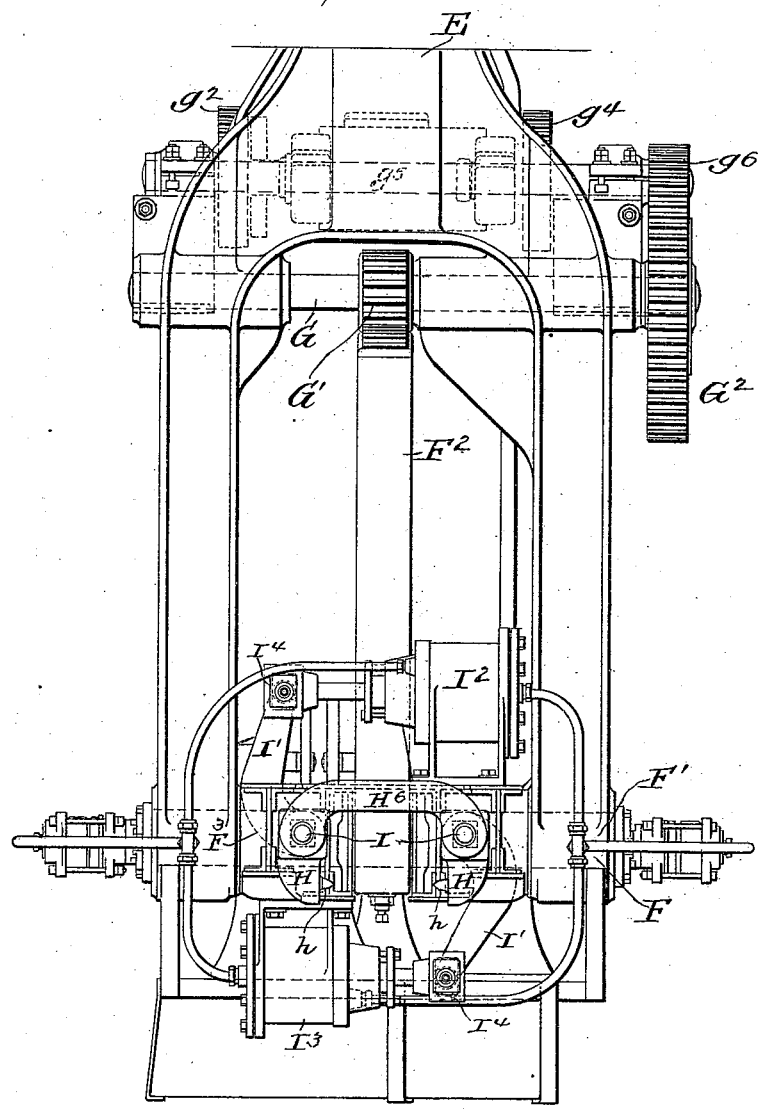
Figure 6:
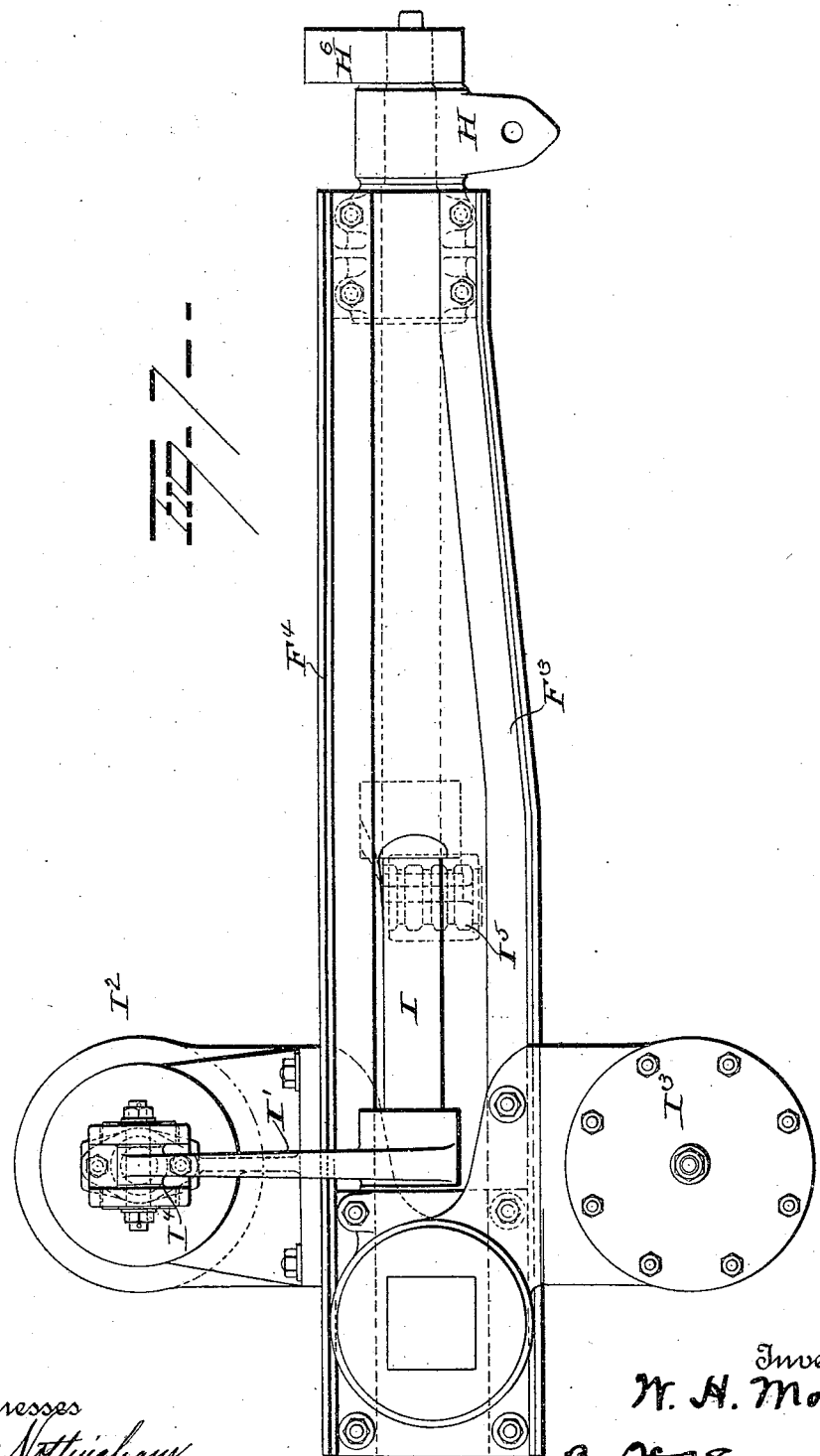
Figure 7:
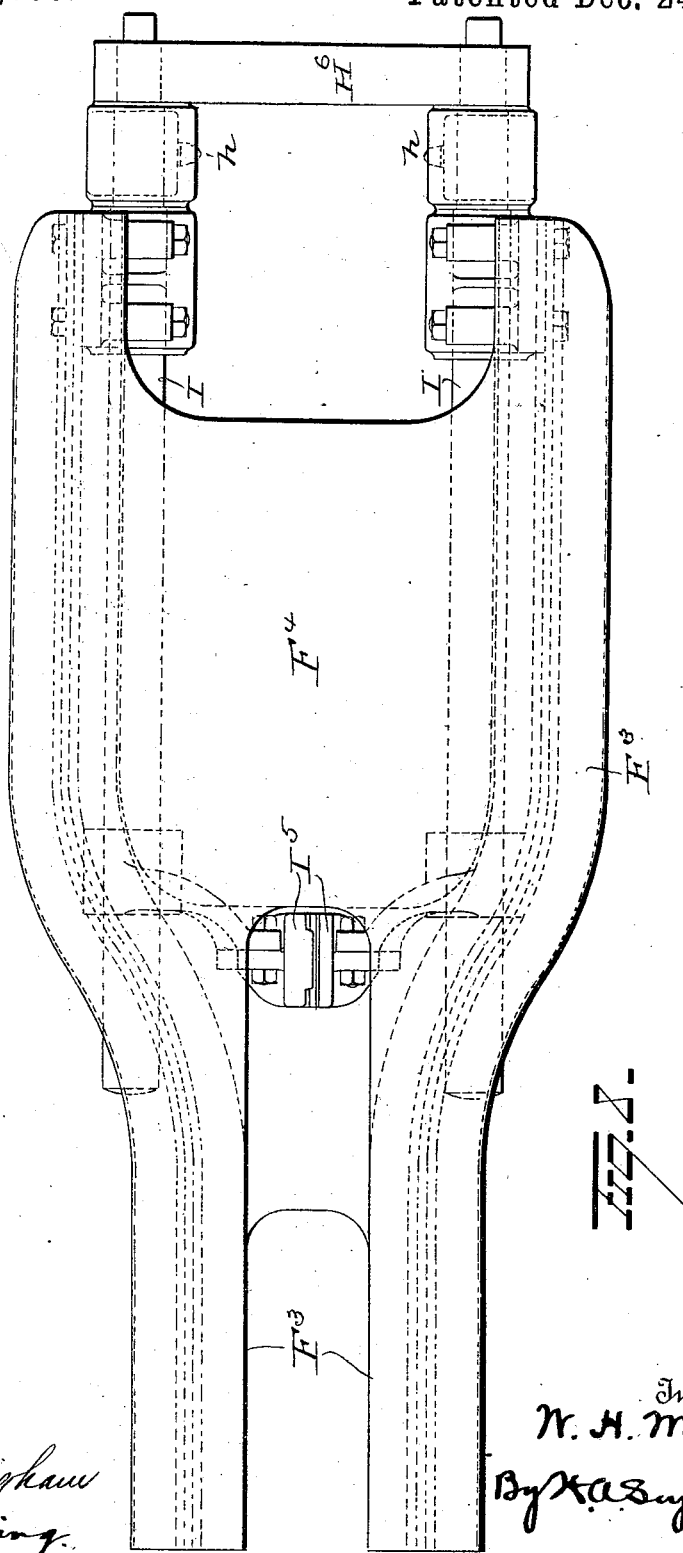

In the accompanying drawings, Figure 1 is a view in elevation designed simply to show the relative positions of the main features of my apparatus. Fig. 2 is a plan view of the trolley. Fig. 3 is a view in side elevation of same. Fig. 4 is a plan view on the line $x\ x$ of Fig. 3, showing the operator's cage and ingot-grasping tongs. Fig. 5 is a side view, and Fig. 6 a view in end elevation, of same. Fig. 7 is a view in side elevation. Fig. 8 is a plan, and Fig. 9 an end elevation, partly in section, of the tongs-frame, the tongs-operating cylinders being omitted in Fig. 8; and Fig. 10 is a view in end elevation, showing in dotted lines the extremes of movement of the ingot-grasping tongs.

The apparatus is necessarily somewhat complicated, and as the details of construction, the relative positions of the parts, and the manner of applying power to the parts can be varied in numerous ways, I have not attempted to minutely describe the details, nor have I drawn claims to the details, as it is my intention in this specification to cover broadly the essential features of the device.

A represents an elevated trackway of any suitable construction designed to receive and support the traveling bridge B. The trackway A extends lengthwise the mill, thus practically including all the floor-space traversed by the ingot in its movements to and from the furnace. The bridge B is mounted on wheels $b$, which latter move on the rails $b'$, and is propelled by a motor and suitable gearing, which however form no part of my present invention. This bridge therefore moves lengthwise the mill and is provided on its upper face with the rails $b^2$ extending lengthwise the bridge. Mounted on the bridge and adapted to travel lengthwise the same is the trolley C, which latter carries the ingot grasping and releasing devices to be hereinafter described. This trolley is mounted on four wheels $c\ c'$, the former of which are the driving-wheels and are actuated by motor D. The armature-shaft $d'$ of the motor carries a pinion 1, which meshes with pinion 2 fast on shaft $d^2$. Shaft $d^2$ carries the pinion 3 which meshes with pinion 4 on shaft $d^3$. Shaft $d^3$ extends transversely of the trolley, is mounted in suitable bearings, and carries at its ends the pinions $d^4$, each of which engages a pinion fast to a driving-wheel $c$ or fast to the axle of a driving-wheel. By means of this motor and gearing the trolley can be moved back and forth on the bridge and as the bridge moves lengthwise the shop it will be seen that the devices carried by the trolley for grasping the ingot can be moved so as to engage an object located at any point of the floor-space within the confines of the trackway A.

Located on the trolley is one or a series of air-reservoirs $E^{14}$ into which air is forced and stored by devices to be hereinafter described, for turning the pillar carrying the ingot-lifting arms, and for actuating said arms. These reservoirs $E^{14}$ are preferably located at one side of the trolley, while the air-compressing pump D' for charging the reservoirs with air is located on the opposite side of the trolley, thus distributing the weight over the surface of the trolley.

The pump D' is provided with a pipe $D^2$ for conveying air therefrom to the reservoirs $E^{14}$, and is actuated by motor $D^3$ and the following gearing: The armature-shaft $d^5$ of the motor carries pinion $d^6$ which engages pinion $d^7$ on shaft $d^8$. Shaft $d^8$ also carries pinion $d^9$ which meshes with pinion $d^{10}$ on crank-shaft $d^{11}$. Connected to crank of shaft $d^{11}$ is the pump-piston $d^{12}$, which latter forces air as it is needed into the reservoirs and stores it under compression for future use.

The stem E is suspended from upwardly-projecting bracket $E'$ and is supported against lateral movement by the bracket $E'$ and by the bracket $E^2$ located below the trolley. The details of the devices for suspending the stem are immaterial, as the same may be varied in numerous ways, it being essential however to suspend the stem in bearings and by means of parts which will permit the stem to turn in its bearings and at the same time be prevented from any lateral or swinging movement. The stem E is provided near its upper end with a pinion $E^3$, which latter meshes with the pinion $E^4$ fast on the vertical shaft $E^5$. This shaft $E^5$ is mounted in bearings secured to the upper bracket $E'$ and is provided at its lower end with a pinion $E^7$. This pinion is engaged by the rack-bar $E^8$, which latter is connected at its opposite ends to the piston-rod $E^9$ connected with a piston working inside of cylinder $E^{10}$. The piston-rod extends through both ends of the cylinder and is connected at its ends to the opposite ends of the rack-bar. The cylinder is supplied with air by pipes leading thereto at both ends from the reservoirs, and the admission of air thereto and its escape therefrom are regulated by the operator located in the cage. Thus it will be seen that by permitting the air to escape from one end of the cylinder and opening the pipe at the opposite end for the admission of air, the stem can be rotated so as to swing the ingot-carrying tongs from one side to the other. This stem is bifurcated at a point below the trolley, as shown in Fig. 6, and the lower ends of the members constituting the bifurcated section are provided with bearings F for the reception of a shaft $F'$. The ends of this shaft are cylindrical so as to turn freely within the cylindrical bearings F while a section of the shaft between the ends is constructed to prevent the segment $F^2$ thereon from turning. Secured to the shaft F is the segment $F^2$ and secured to the shaft on opposite sides of the segment $F^2$ is the frame $F^3$ carrying the ingot-gripping tongs and mechanism for actuating the same. This frame $F^3$ is clearly shown in Figs. 7, 8 and 9 and consists essentially of two side girders bent inwardly at their inner ends having space sufficient between them for the reception of the segment $F^2$. These girders have angular openings corresponding in shape and size to shaft F, so as to turn with the shaft, and the frame thus constructed is covered by the plate or table $F^4$ the under face of which forms a rest or support for the ingot as will be more fully hereinafter described. Journaled in the bifurcated portion of the stem immediately above the upper edge of the toothed segment $F^2$ is the shaft G, which latter carries the pinion $G'$ meshing with the teeth of the segment. The shaft also carries the larger pinion $G^2$ which latter is actuated by the motor $G^3$ (see Fig. 4) mounted on a frame carried by the stem and projecting rearwardly therefrom. This frame consists of two brackets $G^4$ with intermediate connections, the brackets being secured to the stem just below the point of bifurcation and above the top of the segment $F^2$. This frame carries the motor $G^3$ and the latter actuates pinion $G^2$ through the following gearing:

Armature-shaft $g$ of the motor carries pinion $g'$ which meshes with pinion $g^2$ on shaft $g^3$. Shaft $g^3$ also carries a smaller pinion which meshes with pinion $g^4$ on the transverse shaft $g^5$. To the end of shaft $g^5$ adjacent to pinion $G^2$ is keyed pinion $g^6$ which meshes with pinion $G^2$. This motor may be provided with an electrically-operated brake located in the motor-circuit, so that immediately upon the stoppage of the motor the brake is applied and operates to hold the parts whose movements are governed by the motor $G^3$.

From the foregoing it will be seen that by energizing the motor the segment $F^2$ is turned, thus elevating or lowering the frame $F^3$ carrying the ingot-grasping tongs.

The tongs consist essentially of two shafts I (see Figs. 7 and 8) extending lengthwise the frame and journaled in bearings secured to the frame. Each shaft carries a downwardly-projecting block H, and each of the latter is provided with a prong $h$ adapted, when the shafts are turned so as to move the blocks toward each other, to engage the sides of the ingots with sufficient force to hold the same when the frame is lifted by turning the segment. The ingot is preferably grasped at a point between its center and the end adjacent to the apparatus, thus leaving the heavier end of the ingot to the outside of the blocks H. Then, as the frame is turned upwardly or lifted by the segment and gearing before described, the ingot pivots on the prongs until the shorter end thereof engages the under side of the table $F^4$, as shown in Fig. 1, where it is supported until released by the prongs. The free ends of the two shafts are coupled outside of the blocks H by the yoke $H^6$, which latter overcomes any tendency toward spreading of the shafts. By connecting the ingot-carrying frame and the frame carrying the motor $G^3$ to the stem, and locating them on diametrically-opposite sides of the stem, each operates to counterbalance the other, thus lessening the friction on the stem-supporting brackets when the machine is loaded. Each shaft I carries at its rear end an arm $I'$, one of which projects upwardly, while the other projects downwardly, as clearly shown in Fig. 9. Secured to the top of frame $F^3$ near one side thereof is the cylinder $I^2$, and to the bottom of the frame near the opposite side thereof is the cylinder $I^3$, each of which carries a piston actuated by compressed air supplied thereto by pipes leading from the reservoirs carried by the trolley. Each piston has a piston-rod, and the two pistons are connected, each to its respective arm $I'$, by sliding block $I^4$, carried by the arm $I'$ and resting in a slot in the piston-rod. The admission of air to the cylinders is regulated by one valve so as to cause both shafts to rock simultaneously to grasp or release an ingot, and to insure the simultaneous action of the two shafts, I have provided each with a toothed segment I⁵, the teeth of which mesh, as shown in Fig. 9, so that if for any reason one piston fails from any cause whatever to respond promptly, motion would be transmitted to the shaft actuated by said piston directly from the other shaft.

From the foregoing it will be seen that the apparatus can take up an ingot from any part of the mill, convey it to a furnace and deposit it therein, and can take a heated ingot from the furnace and convey it to the rolls, all of the movements of the bridge, trolley, stem and tongs being directly under the control of an operator located in the cage J. This cage J is secured to the stem and girders G⁴ and carries rheostat and switch actuating devices F¹², one for each motor, which control the air-compressing motor, bridge-travel motor, the motor for actuating the segment, and the trolley-motor, and with valve-actuating devices F¹⁴, which regulate the supply of air to and its escape from the cylinder which actuates the stem-rotating rack and the cylinders which actuate the tongs.

The rheostat and switch actuating devices can be of any of the well-known forms now in general use. It is essential that pipes lead from the storage-reservoirs on the trolley to the valves carried by the cage, and from the valves to the several cylinders; but the location of the pipes and the construction of the valves are not material to the case. The air-pipes leading from the reservoirs to the cylinders below the trolley pass down through the stem, and those which supply the cylinders which regulate the movements of the tongs-shaft pass out through the trunnions of the ingot-carrying frame.

From the foregoing it will be seen that the ingot-carrying frame, the operator's cage and the segment-operating devices are carried by the stem and rotate with the stem, and, as the operator's cage is behind the ingot-carrying frame, the operator can always have the tongs constantly in view.

Again by locating the ingot-tongs on a traveling bridge I secure a greater range of movement than would be possible with a device wherein the tongs were mounted on a truck moving on a surface track, and in addition to this advantage the entire floor-space is left clear and obstructed, as the lowest portion of the apparatus rests some distance above the surface of the floor.

It is evident that numerous changes in the details of construction and relative arrangement of the several parts might be resorted to without departing from the spirit of my invention. Hence I would have it understood that I do not confine myself to the details of construction or exact locations of the several parts shown and described, but consider myself at liberty to make such changes and alterations as fairly fall within the spirit and scope of my invention.

Having fully described my invention, what I claim as new, and desire to secure by Letters Patent, is—

1. In an ingot charging device the combination with a trolley, of a stem depending therefrom, the stem being bifurcated at its lower end, a frame carried by said bifurcated end, ingot tongs carried on said frame, and mechanism approximately at right angles to the length of the frame for operating the tongs.

2. In an ingot charging device, the combination with a trolley, of a stem depending therefrom, the said stem being bifurcated at its lower end, a frame carried in the bifurcated end, ingot grasping devices carried by said frame, means approximately at right angles to the length of the frame for actuating the ingot grasping devices, and means for rotating the stem.

3. In an ingot charging device the combination with a traveling bridge, of a stem depending from the bridge, the said stem being bifurcated at a point below the bridge, ingot tongs carried on a support between the members of the bifurcated end of the stem, and means for opening and closing the tongs.

4. In an ingot charging device the combination with a traveling device, of a stem depending therefrom and bifurcated at its lower end, means for rotating the stem, a support carried by the bifurcated end of the stem, ingot tongs mounted on said support between the members of the bifurcated end, and means for opening and closing the tongs.

5. In an ingot charging device, the combination with a traveling device, of a stem on said traveling device, a horizontal bearing carried by the stem, a tilting frame on said bearing, a segment rigid with the tilting frame, means engaging the segment for tilting the frame, and tongs carried by the frame.

6. In an ingot charging device the combination with a traveling device, of a stem depending therefrom, and bifurcated at its lower end, a bearing carried by the bifurcated end, a frame carried by said bearing between the members of the bifurcated end of the stem, and ingot tongs carried by said frame.

7. In an ingot charging device, the combination with a trolley, of a stem depending therefrom and bifurcated at its lower end, means for rotating the stem, a tilting frame mounted within the bifurcated end of said stem, tongs carried by same frame, means for tilting the frame, and means for actuating the tongs.

8. In an ingot charging crane, the combination with a traveling bridge and a traveling trolley thereon, of a vertical stem journaled in and depending from the trolley, means on the trolley for rotating the stem, a tilting frame journaled on a bearing carried by the stem, means for tilting the frame, ingot carrying tongs carried by said tilting frame, means for actuating the tongs, an operator's cage carried by the stem, and means within the cage for controlling the movements of the several motors.

9. In an ingot charging crane, the combination with a traveling bridge, and a traveling trolley thereon, of a stem supported by and depending from the trolley, ingot tongs carried by said stem, air compressor and air reservoirs on the trolley and air pipes leading from the reservoirs to the devices for opening and closing the tongs.

10. In an ingot charging crane, the combination with an overhead traveling device and a stem journaled thereto, the said stem being bifurcated at its lower end, of a tilting frame journaled within the bifurcated end of the stem, ingot tongs carried by said frame and means for opening and closing the tongs.

11. In an ingot charging crane, the combination with an overhead traveling device, and a stem journaled thereto, of a tilting frame journaled to the lower end of the stem, ingot tongs carried by said frame, means for tilting the frame, means for opening and closing the tongs, an operator's cage carried by the stem, and means within the cage for controlling the movements of the several motors.

12. In an ingot charging crane, the combination with an overhead traveling device and a stem journaled thereto, of a vertically tilting frame journaled to a horizontal bearing carried by the stem, an operator's cage secured to the stem in rear of the frame, tongs carried by the frame, means for tilting the frame, means for actuating the tongs, and devices located adjacent to the cage for controlling the movements of the several parts.

13. In an ingot charging device, the combination with a frame, ingot tongs carried by said frame, a segment rigid with the frame, means for rocking the segment and means carried by the frame for opening and closing the tongs.

14. In an ingot charging device, the combination with a support capable of being rotated, a frame carried by said support, tongs carried by said frame, a segment rigid with said frame and means for rocking the segment.

15. In an ingot charging device, the combination with a frame capable of being tilted, and two shafts journaled therein, each shaft carrying an ingot gripping device, of a motor for rocking each shaft.

16. In an ingot charging device, the combination with a frame capable of being tilted, two shafts therein each carrying an ingot gripping device, and connections between the two shafts whereby they are caused to rock simultaneously, of a motor for rocking the shafts.

17. In an ingot charging device, the combination with a frame capable of being tilted, two shafts therein, each carrying an ingot gripping device, and a yoke connecting the free outer ends of the shafts, of means for rocking the shafts.

18. In an ingot charging device the combination with a shaft carrying a frame and a toothed segment and ingot tongs carried by the frame, of an upper shaft having a pinion engaging the segment and a motor and gearing for actuating said upper shaft.

19. In an ingot charging device the combination with an overhead traveling device, a stem depending therefrom and journaled thereto, the said stem being bifurcated at its lower end, and means for rotating said stem, of a frame journaled in the bifurcated end of the stem and carrying ingot grasping devices, a toothed segment rigid with the frame, and motor and gearing carried by the stem for rocking the segment.

20. In an ingot charging device, the combination with an overhead traveling device, a stem depending therefrom and journaled thereto, the said stem being bifurcated at its lower end and means for rotating said stem, of a frame journaled in the bifurcated end of the stem, ingot grasping devices carried by the frame, a toothed segment rigid with the frame, a shaft journaled in the bifurcated portion of the stem and carrying a pinion, and a motor and gearing carried by the stem, for actuating said shaft.

21. In an ingot charging device, the combination with an overhead traveling device, of a bifurcated stem depending therefrom, a tilting frame carried at the bifurcated end of the stem, a segment rigid with said frame, means for actuating the segment for tilting the frame and ingot tongs carried by said frame.

22. In an ingot charging device, the combination with a traveling bridge, a traveling trolley thereon, a depending stem journaled to said trolley and means carried by the trolley for rotating the stem, of a frame journaled to the stem, ingot grasping devices carried by said frame, a segment fast to the frame, a motor and gearing carried by the stem for tilting the table, and means carried by the table for actuating the ingot grasping devices.

23. In an ingot charging device, the combination with a traveling device and a stem carried thereby, of a frame journaled to the stem and carrying ingot grasping devices, a segment fast with said frame, a motor and gearing for actuating the segment, a cage carried by the stem, and devices within reach of the operator within the cage for controlling the motor.

24. In an ingot charging device the combination with a traveling device and a support capable of rotating, carried by said traveling device, of a frame journaled to the support, a segment rigid with the frame, grappling devices carried by the frame, and a motor and gearing for actuating the segment, substantially as set forth.

25. In an ingot charging device the combination with a traveling bridge, a traveling trolley and a depending stem, of a tilting frame carried by the stem, ingot grasping devices carried by the frame, a cage for the operator carried by the stem, motors for actuating the several parts and motor controlling and starting and stopping devices located adjacent to the cage and convenient to the operator therein.

26. In an ingot charging device the combination with a traveling bridge, a traveling trolley therein and a depending stem journaled to the trolley, of a horizontally tilting frame journaled to the stem, devices for tilting said frame, ingot grasping devices carried by the frame, a cage carried by the stem, and motor controlling devices located within or adjacent to the cage for controlling the motors which actuate the bridge, trolley, stem, and the movable parts carried by the stem, substantially as set forth.

In testimony whereof I have signed this specification in the presence of two subscribing witnesses.

WILLIAM HENRY MORGAN.

Witnesses:
 W. C. LLOYD,
 GEO. A. ESTERLY.